United States Patent
Freed

(10) Patent No.: US 11,892,309 B2
(45) Date of Patent: Feb. 6, 2024

(54) DEVICE AND METHOD FOR IMPROVING ROUTE PLANNING COMPUTING DEVICES

(71) Applicant: Polaris Industries Inc., Medina, MN (US)

(72) Inventor: Erik S. Freed, New Brighton, MN (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 17/688,061

(22) Filed: Mar. 7, 2022

(65) Prior Publication Data

US 2022/0187086 A1   Jun. 16, 2022

Related U.S. Application Data

(63) Continuation of application No. 16/369,864, filed on Mar. 29, 2019, now Pat. No. 11,268,820, which is a continuation of application No. 15/267,942, filed on Sep. 16, 2016, now Pat. No. 10,274,331.

(51) Int. Cl.
*G01C 21/34* (2006.01)
*G01C 21/20* (2006.01)
*G06Q 10/047* (2023.01)
*G06F 12/0868* (2016.01)
(Continued)

(52) U.S. Cl.
CPC ......... *G01C 21/3461* (2013.01); *G01C 21/20* (2013.01); *G01C 21/3446* (2013.01); *G06F 12/0868* (2013.01); *G06F 12/0873* (2013.01); *G06F 12/0875* (2013.01); *G06Q 10/047* (2013.01); *G06F 2212/1016* (2013.01); *G06F 2212/302* (2013.01); *G06F 2212/454* (2013.01)

(58) Field of Classification Search
CPC ................ G01C 21/20; G01C 21/3461; G01C 21/3446; G06Q 10/047
See application file for complete search history.

(56) References Cited

U.S. PATENT DOCUMENTS

| 4,546,385 A | 10/1985 | Anastassiou |
| 4,715,031 A | 12/1987 | Crawford et al. |
| 4,745,596 A | 5/1988 | Sato |

(Continued)

FOREIGN PATENT DOCUMENTS

| EP | 3513145 A2 | 7/2019 |
| JP | 2010257115 | 11/2010 |

(Continued)

OTHER PUBLICATIONS

KR20140009283A with English translation (Year: 2014).*
(Continued)

*Primary Examiner* — Calvin Cheung
(74) *Attorney, Agent, or Firm* — Faegre Drinker Biddle & Reath LLP

(57) ABSTRACT

A route generator and method of operating the same including; calculating route traversal values for a plurality of blocks in a first group simultaneously, each block including a plurality of cells, traversal values being values that consider terrain movement cost data and data indicating progress towards a route endpoint on a per-cell basis, wherein the plurality of blocks are chosen such that the blocks in the first group fail to share any edges with other blocks in the first group.

16 Claims, 14 Drawing Sheets

(51) Int. Cl.
    *G06F 12/0873* (2016.01)
    *G06F 12/0875* (2016.01)

(56) References Cited

U.S. PATENT DOCUMENTS

| | | | |
|---|---|---|---|
| 5,030,117 | A | 7/1991 | Delorme |
| 5,031,104 | A | 7/1991 | Ikeda et al. |
| 5,040,168 | A | 8/1991 | Maue et al. |
| 5,475,387 | A | 12/1995 | Matsumoto |
| 5,506,779 | A | 4/1996 | Kanki |
| 5,684,704 | A | 11/1997 | Okazaki |
| 5,769,051 | A | 6/1998 | Bayron et al. |
| 5,886,627 | A | 3/1999 | Brady et al. |
| 5,899,955 | A | 5/1999 | Yagyu et al. |
| 5,910,177 | A | 6/1999 | Zuber |
| 5,938,720 | A | 8/1999 | Tamai |
| 6,102,958 | A | 8/2000 | Meystel et al. |
| 6,192,314 | B1 | 2/2001 | Khavakh et al. |
| 6,195,611 | B1 | 2/2001 | Sakamoto et al. |
| 6,269,303 | B1 | 7/2001 | Watanabe et al. |
| 6,269,305 | B1 | 7/2001 | Yamashita et al. |
| 6,275,231 | B1 | 8/2001 | Obradovich |
| 6,339,745 | B1 | 1/2002 | Novik |
| 6,388,582 | B2 | 5/2002 | Yamashita et al. |
| 6,448,908 | B1 | 9/2002 | Hijikata |
| 6,700,505 | B2 | 3/2004 | Yamashita et al. |
| 6,785,608 | B1 | 8/2004 | Milici et al. |
| 6,963,800 | B1 | 11/2005 | Milbert |
| 7,356,405 | B1 | 4/2008 | Nesbit |
| 7,474,960 | B1 | 1/2009 | Nesbitt |
| 7,702,454 | B2 | 4/2010 | Nesbitt |
| 7,756,635 | B2 | 7/2010 | Milbert |
| 7,818,116 | B1 | 10/2010 | Nesbitt |
| 7,956,861 | B2 | 6/2011 | Case |
| 8,005,613 | B2 | 8/2011 | Rasmussen et al. |
| 8,014,941 | B2 | 9/2011 | Nagel et al. |
| 8,150,620 | B2 | 4/2012 | Motoyama |
| 8,175,801 | B2 | 5/2012 | Tu et al. |
| 8,265,345 | B2 | 9/2012 | Gotoh et al. |
| 8,374,792 | B2 | 2/2013 | White et al. |
| 8,612,140 | B2 | 12/2013 | Gutman |
| 9,002,646 | B1 | 4/2015 | Wan et al. |
| 10,274,331 | B2 | 4/2019 | Freed |
| 10,677,608 | B2 | 6/2020 | Sheha et al. |
| 2002/0042670 | A1 | 4/2002 | Diaz et al. |
| 2006/0095171 | A1 | 5/2006 | Whittaker et al. |
| 2006/0116814 | A1 | 6/2006 | Milbert |
| 2007/0027666 | A1 | 2/2007 | Frankel |
| 2007/0177512 | A1 | 8/2007 | Alexander |
| 2007/0219711 | A1 | 9/2007 | Kaldewey et al. |
| 2007/0229506 | A1 | 10/2007 | Sugita et al. |
| 2007/0253640 | A1 | 11/2007 | Brett |
| 2007/0288480 | A1 | 12/2007 | Caplan et al. |
| 2008/0046174 | A1 | 2/2008 | Johnson |
| 2008/0059015 | A1 | 3/2008 | Whittaker et al. |
| 2008/0167771 | A1 | 7/2008 | Whittaker et al. |
| 2008/0189032 | A1 | 8/2008 | Beadman |
| 2008/0312819 | A1 | 12/2008 | Banerjee |
| 2009/0125229 | A1 | 5/2009 | Peri et al. |
| 2009/0132989 | A1 | 5/2009 | Ou et al. |
| 2009/0164111 | A1 | 6/2009 | Hosoi et al. |
| 2009/0292463 | A1 | 11/2009 | Chase |
| 2010/0063731 | A1 | 3/2010 | Milbert et al. |
| 2010/0094485 | A1 | 4/2010 | Verlut et al. |
| 2010/0100309 | A1 | 4/2010 | Hosoi et al. |
| 2010/0153007 | A1* | 6/2010 | Crowley ............ G01C 21/3889 701/467 |
| 2010/0211244 | A1 | 8/2010 | Jeong et al. |
| 2010/0274487 | A1 | 10/2010 | Neff et al. |
| 2010/0332436 | A1 | 12/2010 | Yanagisawa |
| 2011/0060844 | A1 | 3/2011 | Allan et al. |
| 2011/0098914 | A1 | 4/2011 | Milbert et al. |
| 2011/0251783 | A1 | 10/2011 | Doi |
| 2012/0029804 | A1 | 2/2012 | White et al. |
| 2012/0278505 | A1 | 11/2012 | Hardt |
| 2012/0310691 | A1 | 12/2012 | Carlsson et al. |
| 2013/0311089 | A1 | 11/2013 | Freed et al. |
| 2013/0339352 | A1 | 12/2013 | Jin et al. |
| 2017/0219364 | A1 | 8/2017 | Lathrop et al. |
| 2017/0331722 | A1 | 11/2017 | Greenbaum et al. |
| 2018/0080781 | A1 | 3/2018 | Freed |
| 2018/0108094 | A1 | 4/2018 | Poole |
| 2019/0020578 | A1 | 1/2019 | Beckmann et al. |
| 2019/0226858 | A1 | 7/2019 | Freed |

FOREIGN PATENT DOCUMENTS

| | | | | |
|---|---|---|---|---|
| JP | 2013019683 | | 1/2013 | |
| TW | I269023 | B | 12/2006 | |
| TW | I297472 | B | 6/2008 | |
| TW | 201211505 | A | 3/2012 | |
| TW | I428565 | B | 3/2014 | |
| TW | 201823681 | A | 7/2018 | |
| TW | 201901115 | A | 1/2019 | |
| WO | 2010/005424 | A1 | 1/2010 | |
| WO | WO-2013048640 | A1 * | 4/2013 | ............ G01C 21/20 |
| WO | WO-2013089837 | A1 * | 6/2013 | ............ G01C 21/26 |
| WO | 2018/053277 | A2 | 3/2018 | |

OTHER PUBLICATIONS

"A New GPU-based Approach to the Shortest Path Problem", Hector Ortega-Arranz, Yuri Torres, Diego R. Llanos and Arturo Gonzalez-Escribano, Dept. Informatica, Universidad de Valladolid, Spain; 7 pages.

"An Optimal Pathfinder for Vehicles in Real-World Digital Terrain Maps", F. Markus Jonsson, published 1997, section 4.3.; 47 pages.

"ARA*: Anytime A* with Provable Bounds on Sub-Optimality" in Advances in Neural Information Processing Systems 16: Proceedings of the 2003 Conference, Maxim Likhachev, Geoff Gordon and Sebastian Thrun; School of Computer Science, Carnegie Mellon University; 8 pages.

"Artificial Intelligence: A Modern Approach," Stuart Russell and Peter Norvig, Third Edition, Dec. 11, 2009, pp. 93-99.

"Dogleg" definition from Google search. Retrieved Jan. 26, 2021. (Year: 2021).

"Parallel Ripple Search-Scalable and Efficient Pathfinding for Multi-Core Architectures", Sandy Brand and Rafael Bidarra, Delft University of Technology; 14 pages.

"Solving Path Problems on the GPU", Aydin Bulm;, John R. Gilbert and Ceren Budak, Computer Science Department, University of California, dated Jul. 21, 2009; 23 pages.

Communication pursuant to Article 94(3) EPC issued by the European Patent Office, dated Mar. 19, 2020, for European Patent Application No. 17772836.7; 6 pages.

English translation of Search Report issued by the Taiwan Intellectual Property Office, dated May 1, 2020, for Tawianese Patent Application No. 108127482; 1 page.

English translation of Search Report issued by the Taiwanese Intellectual Property Office, dated Jan. 4, 2019, for Taiwanese Patent Application No. 107131087; 1 pages.

Examination Report No. 1 issued by the Australian Government IP Australia, dated Oct. 2, 2019, for Australian 3atent Application No. 2017326010; 3 pages.

Gamal Selim et al. "Extending Land Navigation Applications to Support Off Road Based on Elevation and Land Characteristics". Proceedings of 2010 IEEE National Conference. ISBN: 978-1-4244-7124-9. pp. 65-72. Jul. 15, 2010.

International Preliminary Report on Patentability (Chapter 1), dated Mar. 19, 2019, for International Patent Application No. PCT/US2017/051800; 11 pages.

International Preliminary Report on Patentability received for PCT Patent Application No. PCT/US17/51800, dated Mar. 20, 2020, 21 pages.

International Search Report issued by the European Patent Office, dated Nov. 21, 2017, for International Patent Application No. PCT/US2017/051800; 6 pages.

(56) References Cited

OTHER PUBLICATIONS

Invitation to Pay Additional Fees received for PCT Patent Application No. PCT/US17/51800, dated Jan. 16, 2018, 11 pages.
Rafia Inam, "A* Algorithm for Multicore Graphics Processors", Master's Thesis, Networks and Distributed Systems Programme, Chalmers University of Technology, Department of Computer Engineering, https://publications.lib.chahners.se/records/fulltext/129175.pdf>, pp. 1-63, dated 2009, 63 pages.
Search Report issued by the Taiwanese Intellectual Property Office, dated Jan. 4, 2019, for Taiwanese Patent Application No. 107131087; 4 pages.
Written Opinion of the International Searching Authority, dated Mar. 22, 2108, for International Patent Application No. PCT/US2017/051800; 10 pages.

\* cited by examiner

DEVICE AND METHOD FOR IMPROVING ROUTE PLANNING COMPUTING DEVICES

RELATED APPLICATIONS

This application is a continuation of U.S. patent application Ser. No. 16/369,864, filed Mar. 29, 2019, now U.S. Pat. No. 11,268,820, issued Mar. 8, 2022, which is a continuation of U.S. patent application Ser. No. 15/267,942, filed Sep. 16, 2016, now U.S. Pat. No. 10,274,331, issued Apr. 30, 2019, titled DEVICE AND METHOD FOR IMPROVING ROUTE PLANNING COMPUTING DEVICES, the entire disclosures of which are expressly incorporated by reference herein.

FIELD OF THE DISCLOSURE

The present disclosure relates generally to route planning devices and methods of operating the same. The present disclosure relates more specifically to improvement in computing operation in route planning devices that increases speed and efficiency thereof.

BACKGROUND

Route planning devices, such as those employing Global Positioning Systems (GPS) can be used to plan a route from one location to another. A* ("A star") is a computer algorithm that is widely used in pathfinding and graph traversal, for plotting an efficiently traversable path between multiple points, called nodes. A* is an informed search algorithm, or a best-first search, meaning that it solves problems by searching among all possible paths to the solution (goal) for the one that incurs the smallest cost (least distance travelled, shortest time, etc.), and among these paths it first considers the ones that appear to lead most quickly to the solution. It is formulated in terms of weighted graphs: starting from a specific node of a graph, it constructs a tree of paths starting from that node, expanding paths one step at a time, until one of its paths ends at the predetermined goal node.

When route planning is restricted to roads, the limited options for travel (limited set of nodes) can allow A* to calculate a path, even a long path, in a span of time that is acceptable to a user. However, route planning via A* can be time intensive and occasionally too-slow for real-time routing, especially for off-road travel. When the potential areas for travel (nodes) are not restricted to roads (such as walking or off-road travel by recreational vehicles or otherwise), the increase in nodes can inundate A* to add significant time to that which is needed to arrive at the output path.

Still further, interpretation of A* instructions by a processor of a routing device causes specific operations within the routing device. The operations of A* proscribe that calculations made for one node have the potential to impact other nodes. Accordingly, nodes are usually processed in a serial, one-at-a-time fashion without the ability to consider calculations from multiple simultaneously processing sources/cores. Relatedly, A* instructions are not configured to allow massively parallel threading such as that employed in a GPU.

Accordingly, what is needed is a device and method for improving operation of routing devices and that is able to quickly and efficiently operate in the large node environment of off-road travel.

SUMMARY

The present disclosure includes a first embodiment method of operating a route generator including: calculating route traversal values for a plurality of blocks in a first group simultaneously, each block including a plurality of cells, traversal values being values that consider terrain movement cost data and data indicating progress towards a route endpoint on a per-cell basis, wherein the plurality of blocks are chosen such that the blocks in the first group fail to share any edges with other blocks in the first group.

The present disclosure also includes a second embodiment method of operating a route generator including: loading data for a first block of cells of a cost map into cache memory of a Graphics Processing Unit, wherein loading of data for one cell in the first block requires loading of data for all cells in the first block, and loading a second set of cells wherein each cell in the second set is not in the first block and shares either an edge or is diagonally adjacent with a cell in the first block, wherein the ratio of the number of cells in the first block to the number of cells in the second set is less than 1:8, wherein the combination of the first block of cells and the second set of cells provide all map data needed to produce traversal values for all cells of the first block, wherein traversal values are values that consider the cost data and data indicating progress towards a route endpoint.

In yet another embodiment, the present disclosure includes a method of operating a route generator including: determining that a first cell is to be processed as part of determining a route; determining that the first cell is within a first block containing at least two cells; loading data needed to analyze all cells within the first block from a first non-volatile memory into a volatile memory accessible by a processor, the data needed to analyze all cells within the first block including all cells that share at least one of an edge and a corner with a cell in the first block; and once all data needed to analyze all cells within the first block is loaded into the volatile memory, analyzing all cells within the first block.

BRIEF DESCRIPTION OF THE DRAWINGS

Corresponding reference characters indicate corresponding parts throughout the several views. The exemplification set out herein illustrates embodiments of the invention, and such exemplifications are not to be construed as limiting the scope of the invention in any manner.

DETAILED DESCRIPTION OF THE DRAWINGS

The embodiments disclosed herein are not intended to be exhaustive or limit the disclosure to the precise forms disclosed in the following detailed description. Rather, the embodiments are chosen and described so that others skilled in the art may utilize their teachings.

The term "logic" or "control logic" as used herein may include software and/or firmware executing on one or more programmable processors, application-specific integrated circuits (ASICs), field-programmable gate arrays (FPGAs), digital signal processors (DSPs), hardwired logic, or combinations thereof. Therefore, in accordance with the embodiments, various logic may be implemented in any appropriate fashion and would remain in accordance with the embodiments herein disclosed.

Figure 1:
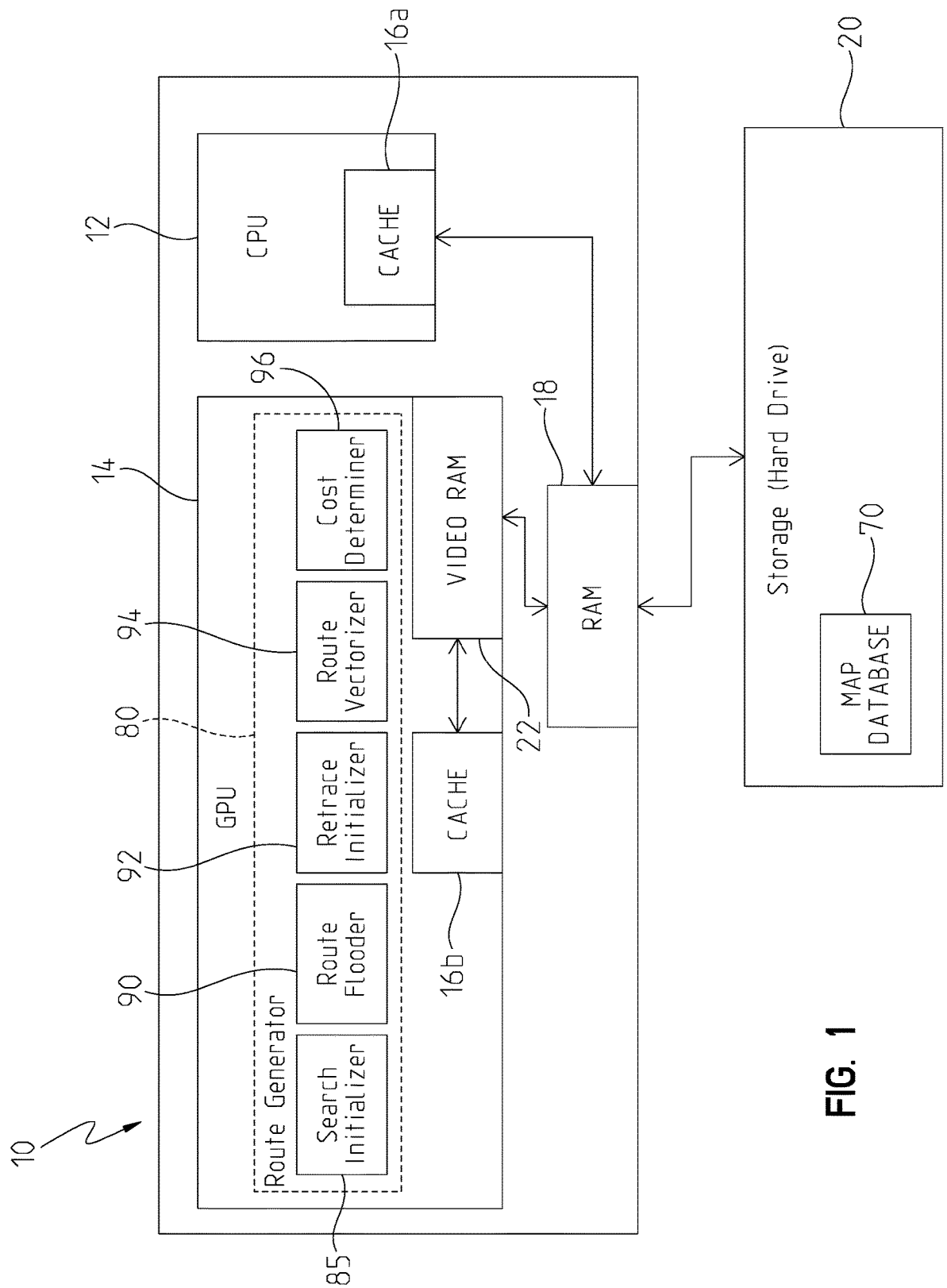
FIG. 1 is a schematic showing an exemplary route planning system.

FIG. 1 shows a route planning computing system 10. System 10 includes one or more processors 12, 14, cache memory 16a,b, RAM 18, and hard drive 20. Processor 12 is a Central Processing Unit (CPU) 12 and processor 14 is a Graphics Processing Unit 14. Each processor 12, 14 has cache memory 16a,b thereon. RAM 18 is shown as being shared between processors 12, 14. However, embodiments are envisioned where each processor 12, 14 has separate RAM 18. Video RAM 22 is ram that is exclusively and/or primarily provided for use by GPU 14. Hard drive 20 is a conventional mass storage device.

As is readily appreciated in the computer arts, faster memory is generally more expensive. Accordingly, computing systems have been designed to have large, relatively slow non-volatile, memories for long term storage. One or more layers of smaller and faster memories are also provided to hold data that is currently being used, or is likely to be used by a processor. Accordingly, RAM 18 and Video Ram 22 have faster access times than the memory of the hard drive 20. The sizes (data capacity) of RAM 18 and Video RAM 22 are smaller than that of the hard drive 20. Similarly, cache 16a,b has faster access times than RAM 18 and Video RAM 22. The size (data capacity) of cache 16a,b is smaller than that of RAM 18 and Video RAM 22. It should be appreciated that these sizes are not required. However, the interest in providing computing speed at a trade-off with price point has led to the relative sizings described above being common.

Accordingly, for a processor (12 or 14) to operate on data, that data is primarily stored in hard drive 20. When processor 12, 14 calls for data, the memories 16, 18, 20, 22 operate in a typical caching form where the closest and fastest memory (cache 16a,b) is first checked. If the desired data is not present at one level of memory (16, 18, 20, 22) the next level is checked. Once the desired data is found, it is pulled up through each level until it is present in cache 16a,b and directly accessible to processor 12, 14.

The smaller size of cache 16a,b provides that often the data held therein is limited to the data immediately needed by processor 12, 14 for the current operation being performed thereby. Movement of the data between memories incurs overhead in the processing and power consumption in that such movement takes time and requires bits to toggle in memory.

GPU 14 is a processor optimized for taking huge batches of data and performing the same operation over and over very quickly. CPU microprocessors tend to skip all over the place handling requests. CPU 12 is composed of a few cores and can handle a few software threads at a time. In contrast, GPU 14 is composed of hundreds of cores that can handle thousands of threads simultaneously.

Figures 2, 3:
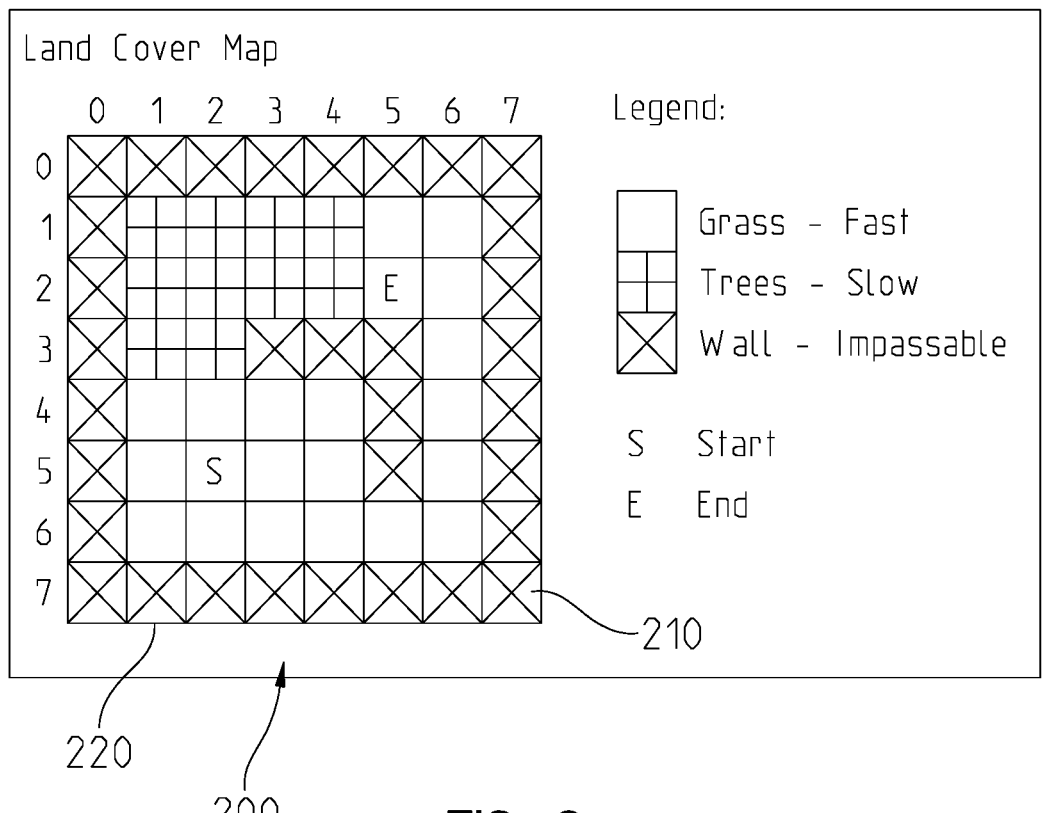
FIG. 2 is an exemplary land cover map considered by the system of FIG. 1.
FIG. 3 is an exemplary cost map generated using the land cover map of FIG. 2.
Figure 15:
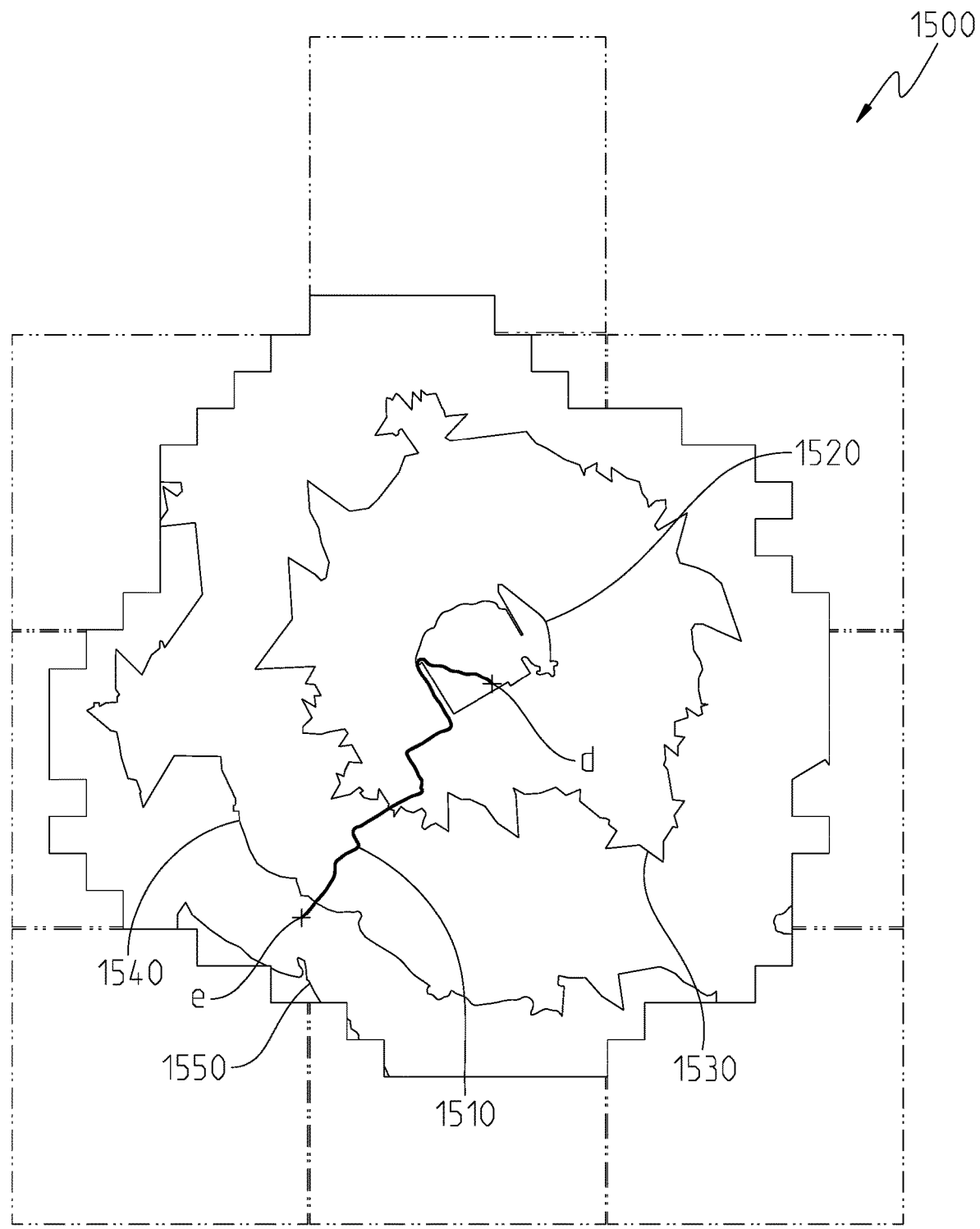
FIG. 15 is an exemplary image showing a visual representation of a traversal map with a route overlaid thereon.

FIG. 2 shows a portion of a land cover map 200 stored in map database 70. In one example, the tile data is obtained from USGS databases and/or is obtained via a standard Geographic Information System (GIS) such as Mapinfo by ESRI, Inc. of Redlands, California Land cover map 200 is separated into tiles (See FIG. 15). Each tile contains multiple blocks 210 (illustratively 64 blocks). FIG. 2 shows one such block 210. Each block 210 illustratively includes an 8×8 grid of cells 220, 64 total cells per block. Each cell 220 contains a single land type. Thus, for purposes of routing, land type within a cell 220 is considered homogenous. Map database 70 further includes an elevation map (not shown).

The land cover map 200 and elevation maps are processed by processor 12, 14 to generate a cost map 300 (FIG. 3). More detail on the specifics of this processing is provided below. In the provided example, cost map 300 is generated by cost determiner 96 to represent how costly, or slow, each map cell is to traverse for the present mode of transportation (walking, wheeled conveyance, etc). Cost values of 5=fast, 15=slow, and ∞=impassable are assigned based on the features of the cell as determined from the land cover map. The cost map 300 is illustratively held in one or more of cache 16b, video RAM 22, and RAM 18. It should be appreciated that different cost maps are generated for each mode of transportation contemplated by a routing routine. Furthermore, while cost determiner 96 is shown as being located within GPU 14, embodiments are envisioned where cost determiner 96 and route generator 80 more generally are instantiated within CPU 12.

When generating an off-road route, a route can potentially proceed from one cell to any of 8 adjacent cells (four laterally adjacent cells, and four corner-adjacent cells). When travelling from any cell A to an adjacent cell B, a cost is accumulated equal to the average cost between cells A and B times the distance between the centers of cells A and B.

Thus, as a route is calculated, any costs for cells to be considered are loaded into cache 16a,b to be accessible to processor 12, 14. Thus, in certain embodiments, when cells are considered one at a time, the cell of interest and its surrounding eight cells are moved into cache 16a,b. While there exists the possibility that some of the cells may already be in cache 16a,b due to considerations of other cells, such an occurrence cannot be relied upon or expected. As such, each cell potentially calls for the movement of data describing nine cells between memories (16, 18, 20). Stated differently, consideration of a cell incurs the overhead of moving another eight cells. Similarly, processing of a cell considers data in the surrounding eight cells.

Figure 4:
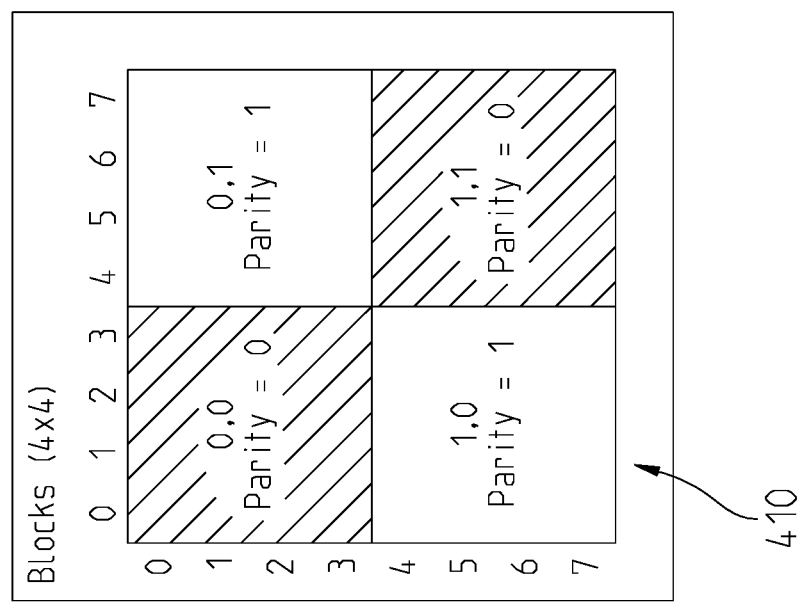
FIG. 4 is an exemplary set of parity blocks applied to the maps of FIGS. 2 and 3.

In the present embodiment, cells are processed at the block 210 level. FIG. 2 shows a block that is 8×8 to contain 64 cells. Other embodiments of block 210 are 4×4, 16×16, or 32×32 cells big. However, it should be appreciated that other sizes of blocks are envisioned. For simplicity, a 4×4 block 410 will be discussed (FIG. 4). Generally, blocks having a side-cell-length of a power of two are contemplated.

Blocks 410 are categorized by what checker color, or parity, they are. As shown in FIG. 4, the gray blocks have a checker value of 0, and the white blocks have a parity value of 1. The parity value is computed by:

parity=(blockX+blockY) mod 2, where MOD2 is a well known operation that returns a value of 1 if it operates on an odd value and returns a value of 0 if it operates on an even value.

This produces a "checkerboard" type pattern where like-parity blocks are only diagonally adjacent each other. Blocks with like parity share no edge with other blocks having the same parity. It should be appreciated that there is no actual coloring of data, just the parity values that are assigned to blocks 410. The coloring is discussed and illustrated here for ease of understanding. The utility of this parity assignment is discussed further below.

Each node/block includes a key value. The key value indicates the priority of the node (or believed importance in providing relevant routing information). Nodes with lower key values are indicated as having increased importance and will be scheduled to be processed sooner.

Figure 5:
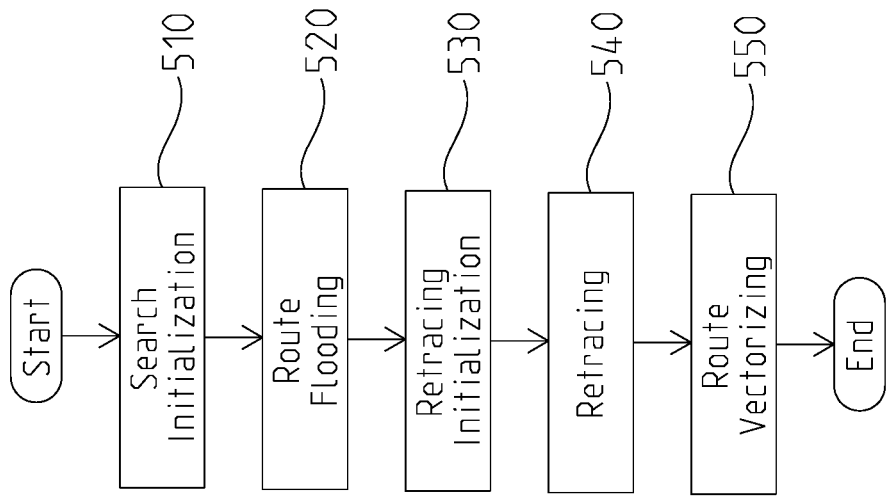
FIG. 5 is a flowchart showing operation of the system of FIG. 1.

For a given routing job, system 10 uses cost map 300 to generate a traversal map. Route Generator 80 is illustratively processor 14 executing code. However, embodiments are envisioned route generator 80 is discrete logic. Route generator 80 creates a traversal map 1500 that has a 1:1 cell correspondence with its cost map (Cost map 300 does not correspond to traversal map 1500). Operation of route generator 80 is illustrated via FIG. 5. Search initialization creates an initial traversal map that is the same size as the cost map and prepares for the start of the route search, element 510. Route flooding floods the search area from the route start point and updates the traversal map with finite values representing the cumulative cost to get from the route start to the route end, element 520. As used herein, the term "flooding" and "flood" refer to the process of generating a route and populating a route map. In the graphical illustration of FIG. 15, it should be appreciated that the route search, generation, and/or population expands out from a route start as if there was a water source there such that water emanated therefrom to flood the search area. Retracing initialization prepares the route flooder to retrace the determined route, element 530. Retracing is performed by the route flooder and follows the search area from the route end point back toward the start, flipping the sign of the traversal values from positive to negative, element 540. Route vectorizing follows the trail of negative traversal values and constructs a list of coordinates representing the final route, element 550. Overall, it should be appreciated that traversal values consider terrain movement cost data and data indicating progress towards a route endpoint on a per-cell basis to arrive at a traversal value for each considered cell.

Search initialization, element 510 via Search Initializer 85, initializes system 10 to provide for operation of route flooding and performance of a route search. A flood mode is set to Traverse mode, which is used later in route sweeping (Flood mode can be set to either traverse or retrace). A traversal map is initialized by creating a map having a 1:1 cell ratio with the cost map. The traversal map is set such that all cells are given a value of infinity (impossible to traverse). A list of current nodes is generated such that the list includes a node that includes the start position. When searching is performed across a block, cells are considered by processing from one side of a block to another (a sweep). Sweeps are able to be performed in four directions (up, down, left, right). Initialization also sets that all four sweep directions are enabled. This sweeping process is discussed further below.

Route flooding, element 520, via Route Flooder 90, is the process of generating the "first draft" route. Route flooding operates for as long as unprocessed nodes exist in a Current Nodes List, element 610, and for so long as a maximum number of iterations has not been exceeded, element 620. The number of allowed iterations varies based on the distance between route start and end. The first portion of route flooding is to figure out which areas are the most likely to be relevant to the current search. This is achieved through use of a block prioritizer. The block prioritizer separates nodes in the Current Nodes List into those nodes to be processed now and those to be processed later, element 630. Nodes to be processed now stay in the Current Nodes list. Nodes to be processed later are moved to a Future Nodes list.

In the present embodiment, nodes are blocks. The present embodiment tracks costs and traversal values for the cell rather than at cell's edges. Thus, while previous routing operations generated eight traversal values for each cell (one for each laterally and corner adjacent traversal points) the present embodiment operates with a single value for each cell rather than eight.

For each node in the Current Node List, the block is processed, element 640. This execution updates the traversal map for the given block and adds nodes for any affected neighboring blocks to an adjacent nodes list. On GPU 14, blocks in the current node list may be executed in parallel, each on its own streaming multiprocessor (which have previously been subjected to parity checks, discussed below).

Once all nodes in the Current Node List are processed (no more nodes in Current Node List, element 610), for so long the Future and Adjacent node list is not empty, element 660, nodes from the Future Node list and the Adjacent Nodes List are moved to the Current Nodes List and processed, element 650.

Figure 7:
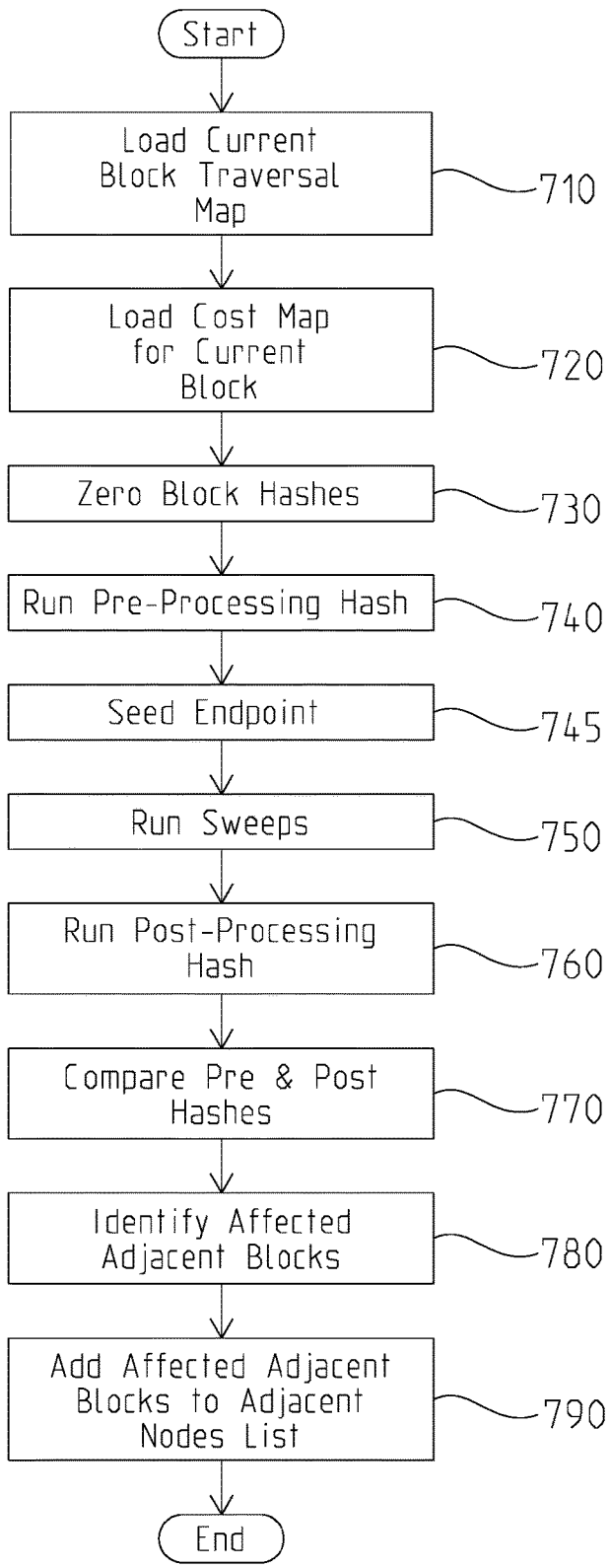
FIG. 7 is a flowchart showing processing of nodes of FIG. 6.
Figure 8:
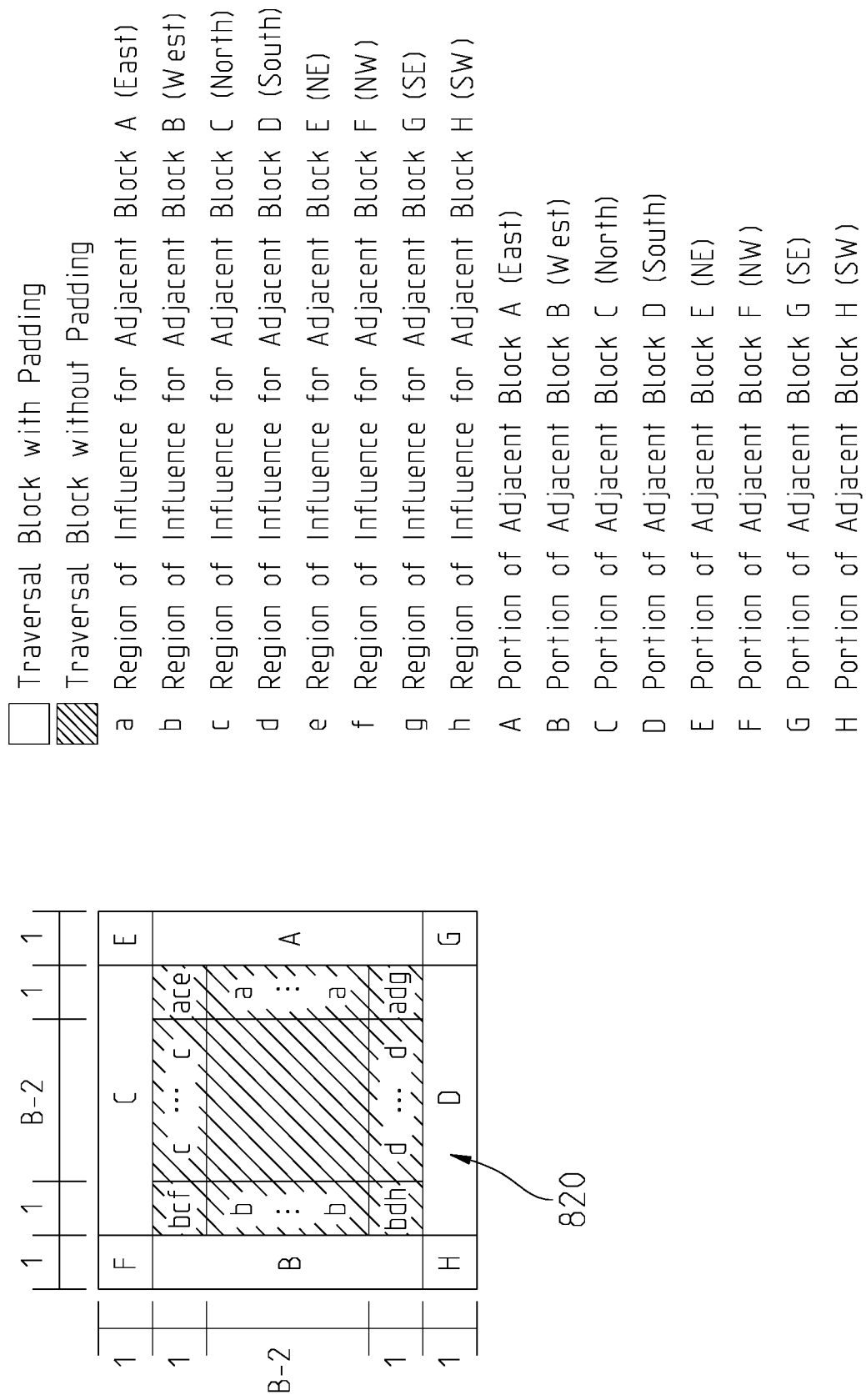
FIG. 8 is an exemplary logical traversal block construct and a region of influence therefor.

With respect to processing of a node/block, element 640, additional detail is shown with reference to FIG. 7. First, the traversal map for the current block is loaded, element 710. As noted above, at initialization, the traversal map is populated with infinity values for all cells. When a block is loaded, all the cells of that element 810 are loaded along with a one-cell wide padding ring 820, FIG. 8. The padding ring 820 is made up from cells that are actually part of adjacent (laterally and diagonally) blocks. Because a change in a traversal cell can affect any of its neighboring cells, any change in the cells along the edge of a traversal block can affect the cells in certain adjacent traversal blocks. The set of edge cells in a traversal block that affect an adjacent block are said to be part of that adjacent block's Region of Influence. Thus, the padding ring 820 is loaded such that a comprehensive list of cells that potentially influence the cells within element 810 are present to be part of the processing. When cells are processed one-at-a time, loading a padding ring presents eight cells of padding for one cell (or an 8:1 ratio of padding overhead to processed cells). The present example of a (at least) 64-cell block presents (no more than) 36 cells of padding for the 64 cells of the block. This presents a 0.5625:1 ratio of padding overhead to processed cells. Thus, the block processing provides for approximately a 14× reduction in overhead. Thus, the present embodiments contemplate a ratio of padding to cells of less than 8:1. Indeed, in blocks having 16 cells the padding has no more than 20 cells. In general, the number of cells needed for padding is four times the block width (in cells) plus four (for the corners).

Next, the cost map that corresponds to the currently processing block is also loaded, element 720. The cost map is likewise loaded with a one-cell padding ring. Then, block hash values are set to zero (block hashes are discussed in more detail below), element 730.

The system 10 uses nodes in a prioritized list to schedule search work items. Work items are represented as blocks of traversal cells, rather than using edges, thereby, reducing the number and scheduling overhead of work items. Stated differently, system 10 is intrinsically raster-based, where it represents each block as a single node. While other embodiments of route mapping systems rely on a vector-based representation of a graph, i.e. an explicit set of all vertices and edges where they must represent each cell with 8 nodes, one for each connected edge, providing each block as a single node provides an reduction in memory requirement (on the order of eight times (due to not having to account for each cell edge, times the number of cells in a block; e.g. 8×32×32=8192). This memory requirement reduction greatly improves computational throughput and increases the size of the route search that can be supported.

As previously discussed, each block has eight adjacent blocks. Changes in a traversal value for an outer edge cell of a current block has the potential to impact values for cells that are in adjacent blocks. The hash values keep track of when traversal values for these outer cells change and then adjusts the hash value for the block. The hash values thus keep track of which adjacent blocks are potentially changed by operations on a present block. Thus, changes in the hash value cause appropriate adjacent blocks to be identified and placed into the "Adjacent Node" list.

Thus processing of a block first sets block hashes to zero, element 730. Pre-processing hashes are then set based on an initial state of the traversal map for the block being processed, element 740. Hashes are set by applying a hashing function to the data within a block so as to output a value representative of the data within each cell. The endpoint is then seeded, element 745. Seeding the endpoint includes setting a value of a route source location to have a traversal value of epsilon ($1.4 \times 10^{-45}$). (When in retrace mode, discussed below, seeding the endpoint involves inverting (positive to negative) the value associated with the route endpoint). As sweep operations are performed (discussed below), any modifications to the traversal map are made, as appropriate, element 750. Once the block is processed, the hash operation is again applied to the traversal map to produce a hash of the traversal map, post-processing, element 760. This post processing hash is then inverted such that any positive values are then negative and any negative values are changed to positive. The post processing hash is then added to the pre-processing hash. This operation serves to compare the pre-processing hash and the post-processing hash, element 770. If there has been no change to a given cell, then the pre-processing hash and inverted post-processing hash will cancel each other out during the adding. Thus, any cells in a region of influence having a non-zero sum of the pre- and post-processing hash is identified as changed. Adjacent blocks that are potentially affected by such changed cells are identified as adjacent blocks to be further processed by creating a new node for each affected block, element 780. Such affected blocks are added to the Adjacent Nodes list, element 790.

One hash function that is suitable is a bitwise copy from IEEE-754 specified 32-bit float to 32-bit integer, an operation in C/C++ and other similar programming languages:
  int HashFunction(float traversal) {
  int hash=*(int*)(&traversal);
  return hash;
  }

Figure 10:
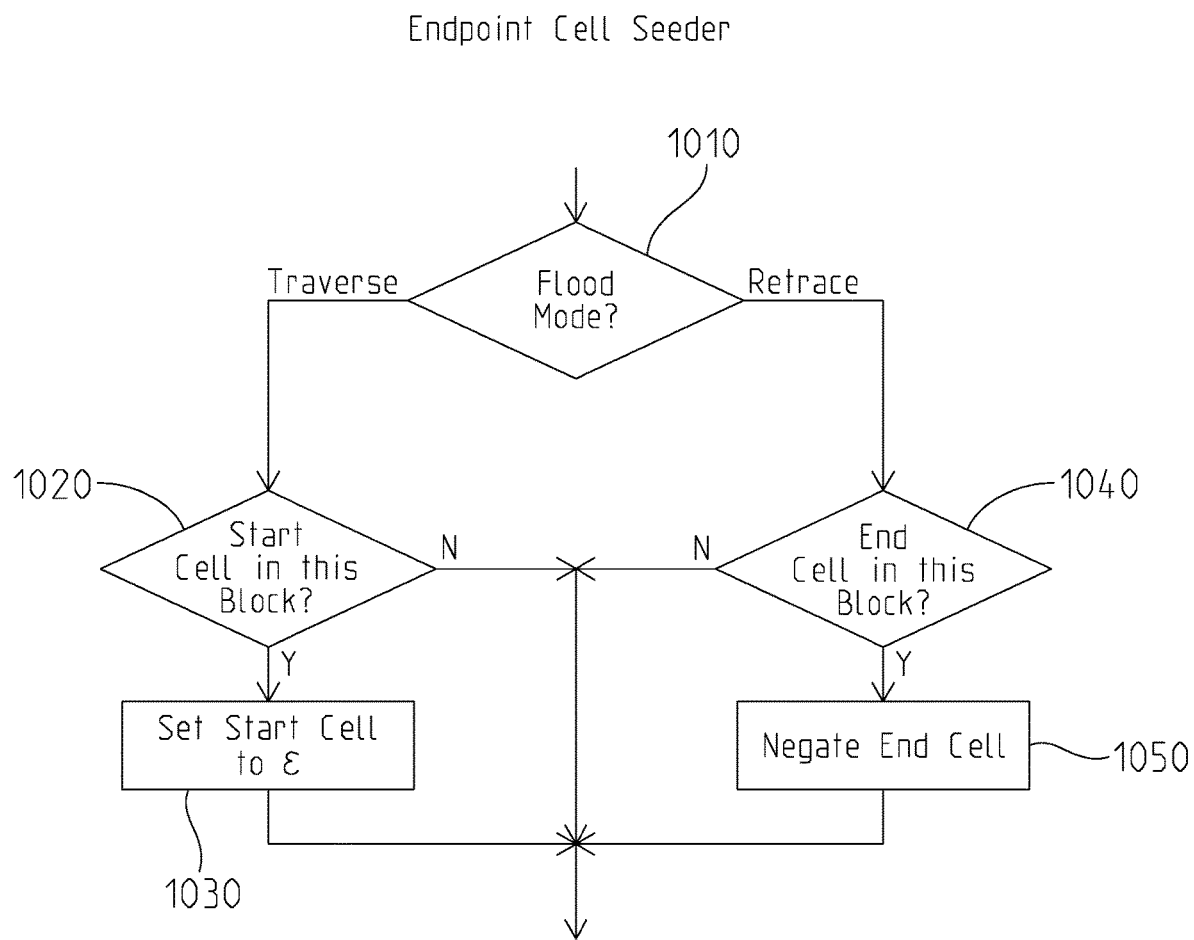
FIG. 10 is a flowchart showing operation of an endpoint cell seeder of FIG. 7.

FIG. 10 shows increased detail on an endpoint seeding operation, element 745. Endpoint seeding first determines the flood mode being employed (traverse or retrace), element 1010. Retrace mode is discussed below. When the flood mode is traverse, system 10 determines if the route's start point is within the current traversal block, element 1020. If the route's start point is within the current traversal block, then the start point cell is given a value of epsilon (c), element 1030. This is the smallest number discriminately greater than zero. It takes no cost to travel no distance (get to the starting point). However, since the system distinguishes positive numbers from negative in the Retrace flood mode, using c achieves both purposes.

When the flood mode is Retrace, system 10 determines if the route's end point is within the current traversal block, element 1040. If the route's end point is within the current traversal block, then the end point cell is given an inverted value (a traversal value of 5 is changed to be −5), element 1050.

Figure 9A:
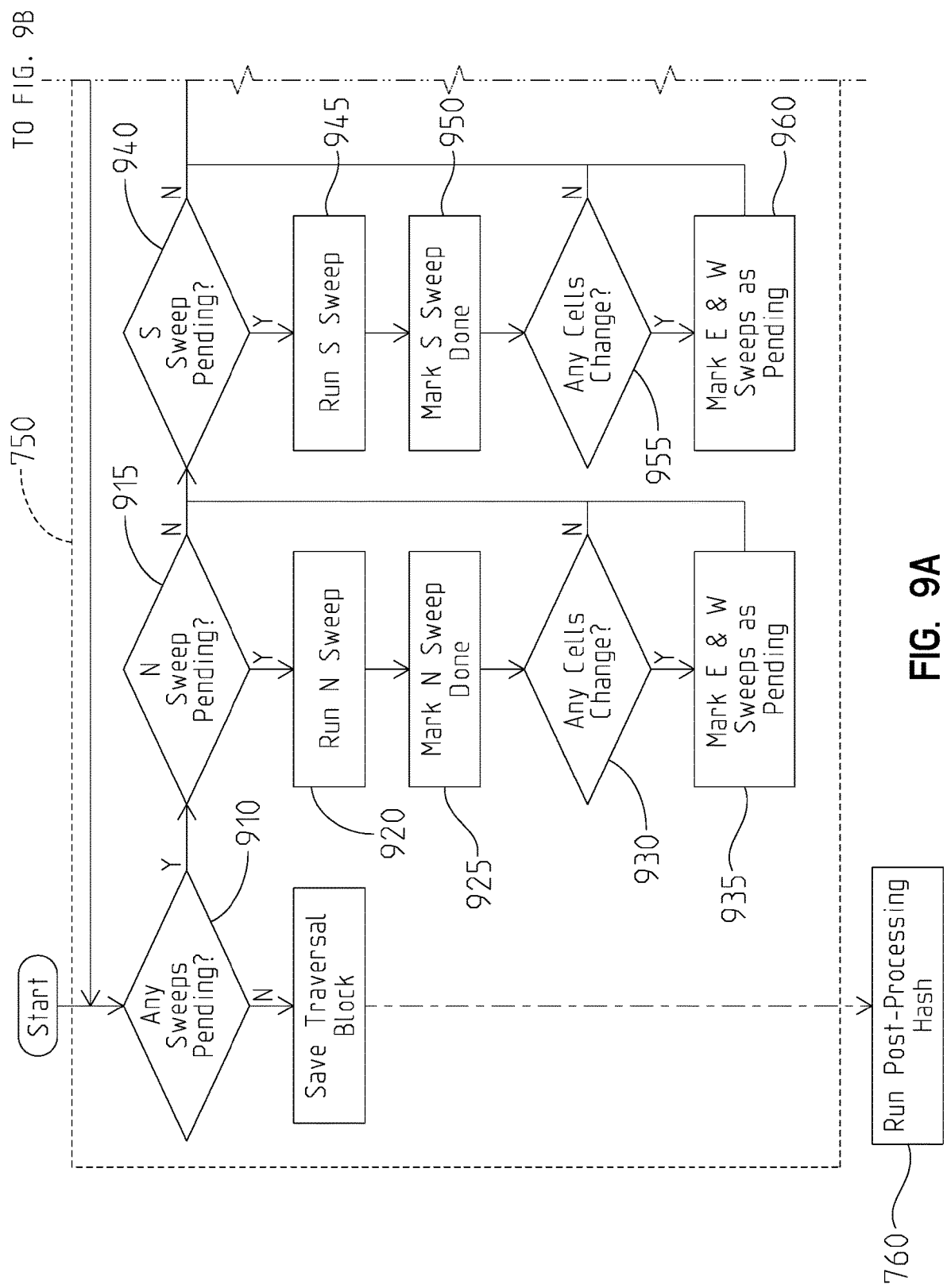
FIGS. 9A-B are a flowchart showing operation of a block sweeper of FIG. 7.
Figure 9B:
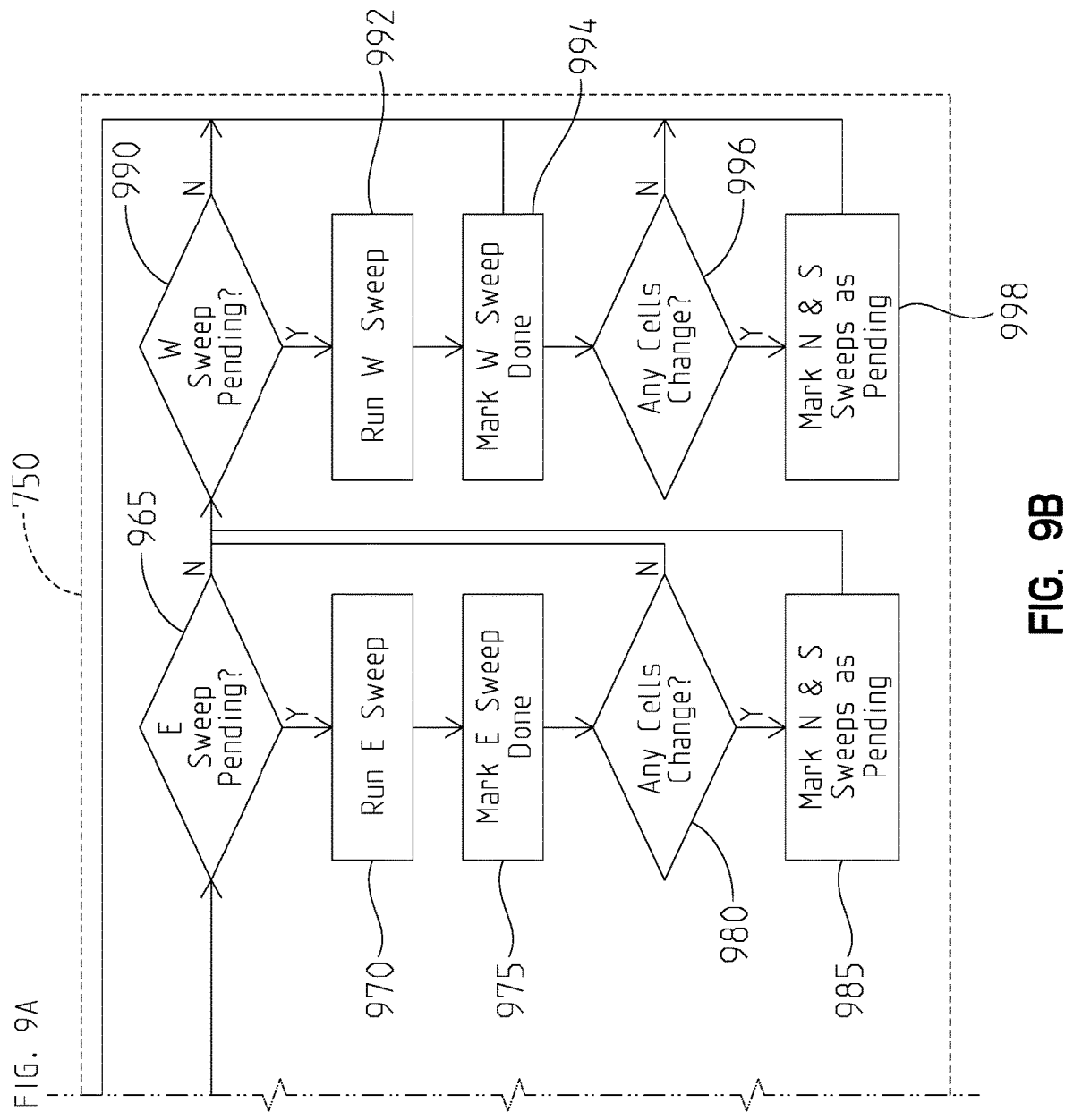

FIGS. 9A-B show increased detail on a sweeping operation, element 750 of FIG. 7. Block sweeping potentially includes up to four sweeps (Up/North "N", Down/South "S", Left/West "W", and Right/East "E"). Upon first receiving a block, all four sweeps are scheduled to be performed. Accordingly, the block has indications associated therewith in a sweep register stating that all four sweeps (N, S, E, W) are pending. If the block has been entered for processing due to having previously been processed followed by processing of one or more adjacent blocks indicating that the present block was potentially changed, less than all sweeps may be scheduled via the sweep register.

The sweeping process first determines if any sweeps are pending for the currently considered block, element 910. If at least one sweep is pending, then system 10 starts executing sweeps. Additional detail on "executing sweeps" is provided below with reference to FIG. 11. System 10 first checks to see if a "N" sweep is pending, element 915. If not, system 10 proceeds to see if a "S" sweep is pending, element 940.

If an N sweep is pending then an N sweep is run, element 920. At the conclusion, the sweep register is updated to reflect that the N sweep is completed, element 925. System 10 then determines if the N sweep changed any traversal values, element 930. If no traversal values were changed, system 10 proceeds to see if an "S" sweep is pending, element 940. If the N sweep did change at least one traversal value, then the sweep register is updated to mark the E and W sweeps as pending, element 935. It should be appreciated that the E & W sweeps may have already been noted as pending. System 10 then proceeds to see if an "S" sweep is pending, element 940.

If an S sweep is not pending, system 10 proceeds to see if a "E" sweep is pending, element 965. If an S sweep is pending then an S sweep is run, element 945. At the conclusion, the sweep register is updated to reflect that the S sweep is completed, element 950. System 10 then determines if the S sweep changed any traversal values, element 955. If no traversal values were changed, system 10 proceeds to see if an "E" sweep is pending, element 965. If the S sweep did change at least one traversal value, then the sweep register is updated to mark the E and W sweeps as pending, element 960. Again, it should be appreciated that the E & W sweeps may have already been noted as pending via starting values, via changes from the N sweep, or otherwise. System 10 then proceeds to see if an "E" sweep is pending, element 965.

If an E sweep is not pending, system 10 proceeds to see if a "W" sweep is pending, element 990. If an E sweep is pending then an E sweep is run, element 970. At the conclusion, the sweep register is updated to reflect that the E sweep is completed, element 975. System 10 then determines if the E sweep changed any traversal values, element 980. If no traversal values were changed, system 10 proceeds to see if an "W" sweep is pending, element 990. If the E sweep did change at least one traversal value, then the sweep register is updated to mark the N and S sweeps as pending, element 985. System 10 then proceeds to see if an "W" sweep is pending, element 990.

If a W sweep is not pending, system 10 proceeds back to see if any sweep is pending, element 910. If a W sweep is pending then an W sweep is run, element 992. At the conclusion, the sweep register is updated to reflect that the W sweep is completed, element 994. System 10 then determines if the W sweep changed any traversal values, element 996. If no traversal values were changed, system 10 proceeds to see if any sweeps are pending, element 910. If the W sweep did change at least one traversal value, then the sweep register is updated to mark the N and S sweeps as pending, element 998. System 10 then proceeds to see if any sweeps are pending, element 910.

Eventually, the sweeps will cease to cause changes in the traversal values, such that the traversal values reach a steady state. When this happens, the lack of changes will allow all sweeps to be completed without calling for other sweeps. With no sweeps pending, system 10 proceeds to save the traversal values, element 915. Once saved, system 10 continues on to run the post processing hash, element 760.

As discussed, in many cases, the sweeps cause changes in traversal values and specifically cause traversal values to change along edges of a given block such that the traversal changes potentially impact calculations for cells in adjacent blocks. Such affected blocks are added to the Adjacent Nodes list, element 790. Adding blocks to the Adjacent Nodes list includes establishing properties for the added nodes. These properties include a Key value (which determines its priority), its location (potentially a set of coordinates), and initial sweeps (the sweep operations to be performed when the block is processed).

The key value is illustratively determined via the formula:

Key=min (traversal cells in region of influence)+
Minimum Cost*Reach distance.

"Traversal cells in region of influence" are those cells in the current block that border the adjacent cell being considered such that if the adjacent block was loaded, the "traversal cells in region of influence" would also be loaded as part of the padding ring therefor. In an 8×8 cell block, for a laterally adjacent block, the system 10 would expect eight traversal cells in region of influence. For a diagonally adjacent block, the system 10 would expect one traversal cell in the region of influence. Thus, the "min( )" portion of the formula would find the cell having the lowest traversal value from the relevant group and use that value.

"Minimum Cost" is the value of the smallest possible cost cell. In one example, the lowest cost value possible is a "5." Reach distance is the distance, in cell lengths, to travel from a cell in the region of influence and closest cell in the adjacent block. For adjacent blocks directly North, South, East or West (laterally adjacent), the reach distance is 1. For the four diagonal adjacent blocks (diagonally adjacent), the reach distance is $\sqrt{2}$.

Figure 11:
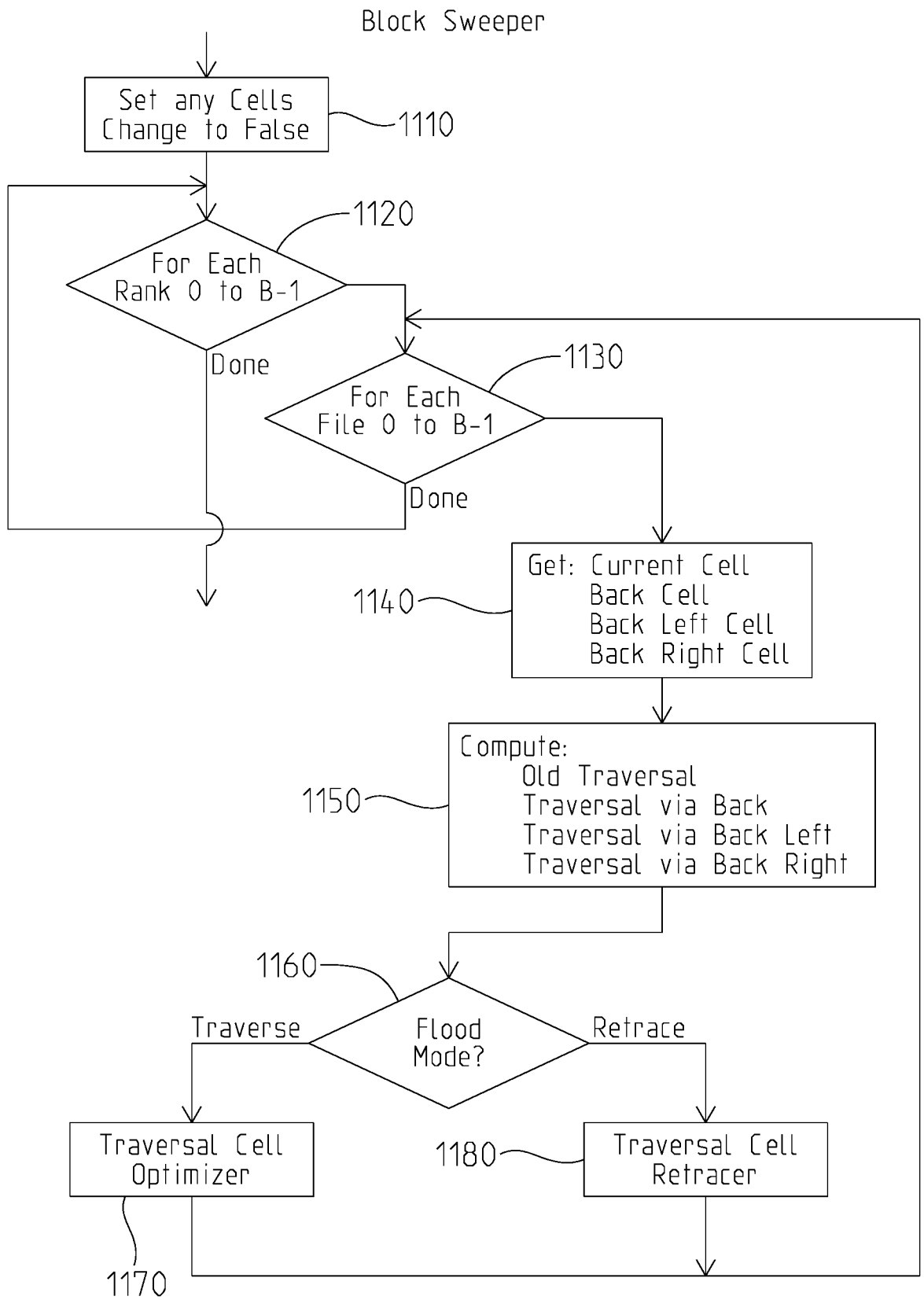
FIG. 11 is a flowchart showing more detail regarding the block sweeping of FIGS. 9A-B.

As discussed above, "sweeping" is what updates traversal cell values. This sweeping happens in four directions (N, S, E, W), elements 920, 940, 970, 992. FIG. 11 provides additional detail on what sweeping entails. Block Sweeping focuses on sweeping the block in one of four directions, where each sweep uniformly evaluates 3 of the 8 neighbors for each cell.

First, a Sweeper Changed Traversal, a boolean value indicating whether any traversal block cells have been modified by the block sweeping, is set to false, element 1110. At this point, system 10 establishes an outer for-loop to iterate through rank values from back to front, element 1120, where a rank is a column of cells in a block for a W or E sweep, or a row of cells in a block for a N or S sweep. If processor XX is a CPU, then there is an inner loop that iterates through all cells (rows), element 1130. If processor XX is a GPU, then all cells of a row are executed simultaneously, each on a separate streaming processor. When processed, for each cell, a "back," "back left," and "back right" cells are identified, element 1140. The directions "back," "back left," and "back right" are in reference to the direction of sweep. The current value of the traversal cell is also set to "current cell" to enable later determining a changed traversal value.

The traversal value from the back cell is determined as (element 1150):

traversal via back=traversal(back cell)+½*(cost(current cell)+cost(back cell))

The traversal value from the back-left cell is determined as:

traversal via back left=traversal(back left cell)+
$\sqrt{2}$/2*(cost(current cell)+cost(back left cell))

The traversal value from the back-right cell is determined as:

traversal via back right=traversal(back right cell)+
$\sqrt{2}$/2*(cost(current cell)+cost(back right cell))

The current traversal value is then determined by calculating the cost to get to the current cell from each of the "back," "back left," and "back right" cells to find the lowest cost possibility. To do this, the system runs either Traversal Cell Optimizer, element 1170, or Traversal Cell Retracer, element 1180, depending on the current Flood mode, element 1160, to compute the appropriate new traversal cell value based on the old value and the three back traversal values. Either module sets Sweeper Changed Traversal to true if the current traversal cell is modified.

It should be appreciated that values in a given rank depend only on values from a previous rank. Thus, simultaneous processing of cells within a rank via GPU is possible as the co-processed cells are independent of each other.

When the flood mode is Traverse, Traversal Cell Optimizer is used in block sweeping to define how traversal cells are to change value and propagate the search for the best route. It works as follows:

First, system 10 evaluates the new traversal value:

traversal(current cell)=min({old traversal, traversal via back, traversal via back right, traversal via back left})

If: abs(traversal(current cell)−old traversal)>Tolerance, then the Sweeper Changed Traversal value is set to true. This lets system 10 know that the best known paths in the traversal block are still being improved upon, and that more sweeps in different directions are called for.

When the flood mode is Retrace, Traversal Cell Retracer is used by Block Sweeper, discussed further below.

For each node in Adjacent Nodes, system 10 computes a Heuristic function for the node, and adds it to the node's key, element 642. As with the well-known A* algorithm, the key represents the total cost accumulated so far plus the heuristic or estimated cost to the goal. Since the node keys in Adjacent Nodes only represents the total cost, or traversal.

The Heuristic function is computed as the distance from the route's end cell to the closest cell in the block multiplied by the minimum cost map. To compute this system 10 computes horizontal distance dx=max ({end X−(node X*B+(B−1)),(node X*B)−end X,0}), where the first term in the curly braces determines dx if route end is East of block, the second term if West, and the third term if end is within East and West bounds of block. Next system 10 computes Compute vertical distance dy=max ({end Y−(node Y*B+(B−1)), (node Y*B)−end Y,0}). System 10 then computes distance d=√(dx^2+dy^2). The Heuristic function is then calculated as d*MinimumCost.

After Route Flooder has executed all the blocks in Current Nodes, Current Nodes may be cleared, element 645. Remaining work is found in the Future Nodes and Adjacent Nodes lists. A Next Block Planner prioritizes the nodes in Adjacent Nodes, replaces the Current Nodes list with the concatenation of the Adjacent Nodes and Future Nodes Lists, and merges any duplicate nodes by calling Block Reducer, element 650.

Since adjacent node adding, element 790, and Next Block Planning add more nodes to the Current Nodes list without considering that other nodes are already in the list, there can be duplicate nodes present. A Block Reducer finds where there are multiple node instances representing the same block and combines them into one. When multiple nodes are combined, Block Reducer provides that the combined instance adequately captures the information of the original instances. For example, if node A had initial sweeps of North and East while node B had initial sweeps of South and East, the combined node would have initial sweeps of North, South, and East. Similarly, if node A has a key of 100 (more urgent) and node B has a key of 800 (less urgent), the combined key will be 100.

Figure 12:
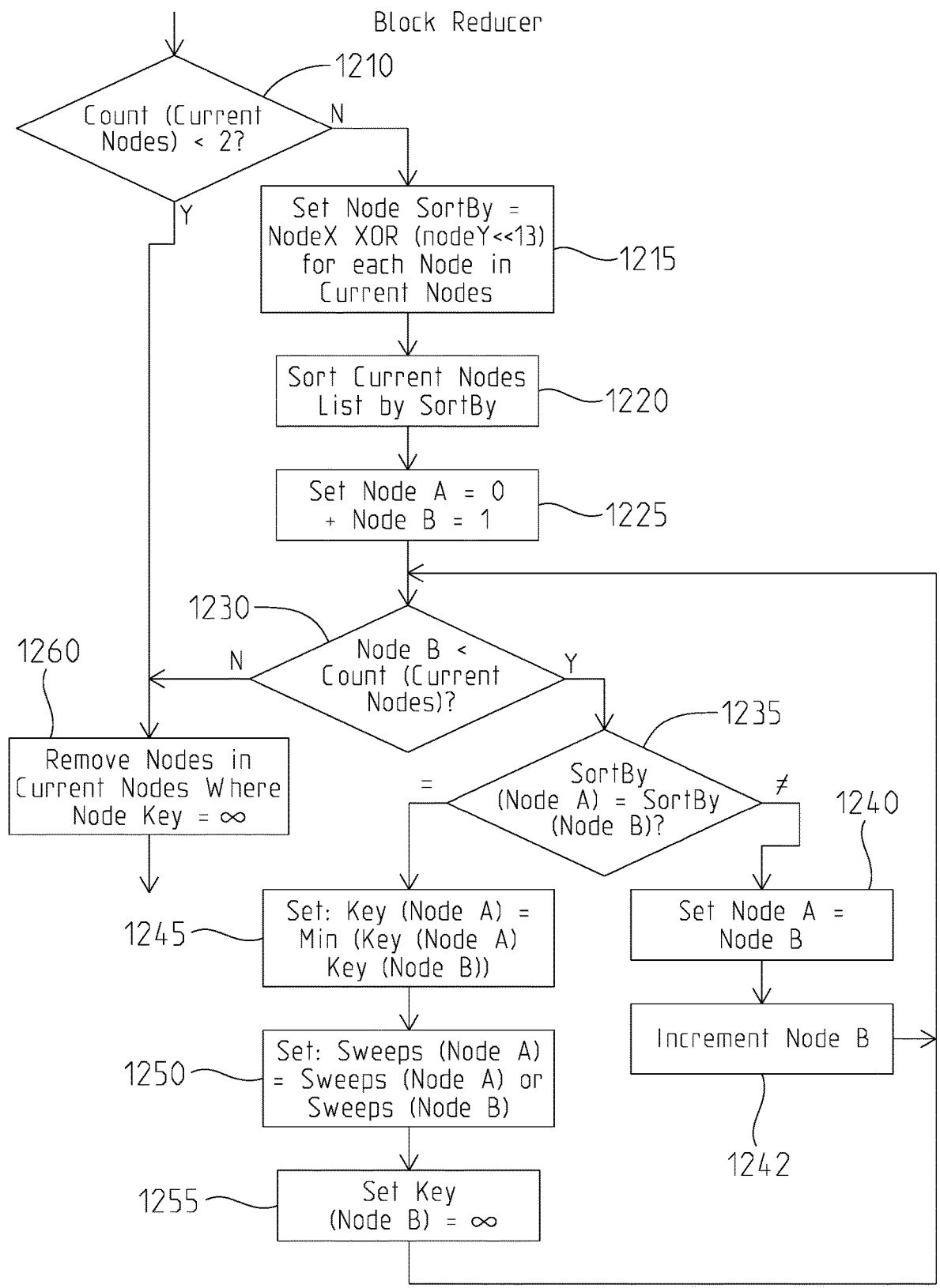
FIG. 12 is a flowchart showing operation of a block reducer employed after adjacent node adding of FIG. 7.

More specifically, Block Reducer operates as shown in FIG. 12. The Block Reducer checks to see how many nodes are in the Current Node list. If there are fewer than two nodes in Current List, element 12, skip to element 1260. If there are greater than two nodes, then the Block Reducer continues to set the node SortBy value to be equal to a node's X XOR (node's Y<<13), where XOR is a logical exclusive OR operation and "<<" is a logical bit shift left operation, both operations readily available on any software platform. The XOR and <<operations are well known operations available on most all processors. The SortBy property functions as a hash code, allowing any nodes representing the same block to have the same SortBy value. This is done for each node in Current Nodes, element 1215.

The nodes of the Current Nodes list are then sorted by their SortBy property, element 1220. Programs such as Quicksort on a CPU or Bitonic Sort on a GPU are illustratively used for this process. The direction of sort does not matter. What matters is that nodes for the same block are adjacent to each other in the sorted list.

Block Reducer then initializes two node pointers. Node A starts on the first node in the Current Nodes and node B starts on the second, element 1225

The system then checks if node B is at the end of the Current Nodes, element 1230. If Block Reducer is at the end of the Current Nodes, it proceeds to element 1260. If there Block Reducer is not at the end of the Current Nodes, then Block Reducer sees if node A value is equal to node B value, element 1235. If they are not equal, the node A is set to the node B value, element 1240, and node B is incremented by one to point to the next values in Current Nodes (next node A is the previous node B), element 1242. If node A and node B are found to have the same value, then duplicate nodes have been found. Node Merger is run on the nodes to merge the properties of the nodes to extract information (key value, sweeps) from each of the nodes into a combined node and it is saved as node A, elements 1245, 1250. The key value for node B is set to infinity and thereby marked for deletion, element 1255. Node B is then advanced to point to the next node in the Current Nodes list and Block Reducer returns to element 1230.

Once the Current Nodes List is processed, Block Reducer proceeds to remove nodes in the Current Nodes List having a key value of infinity, element 1260.

Figure 6:
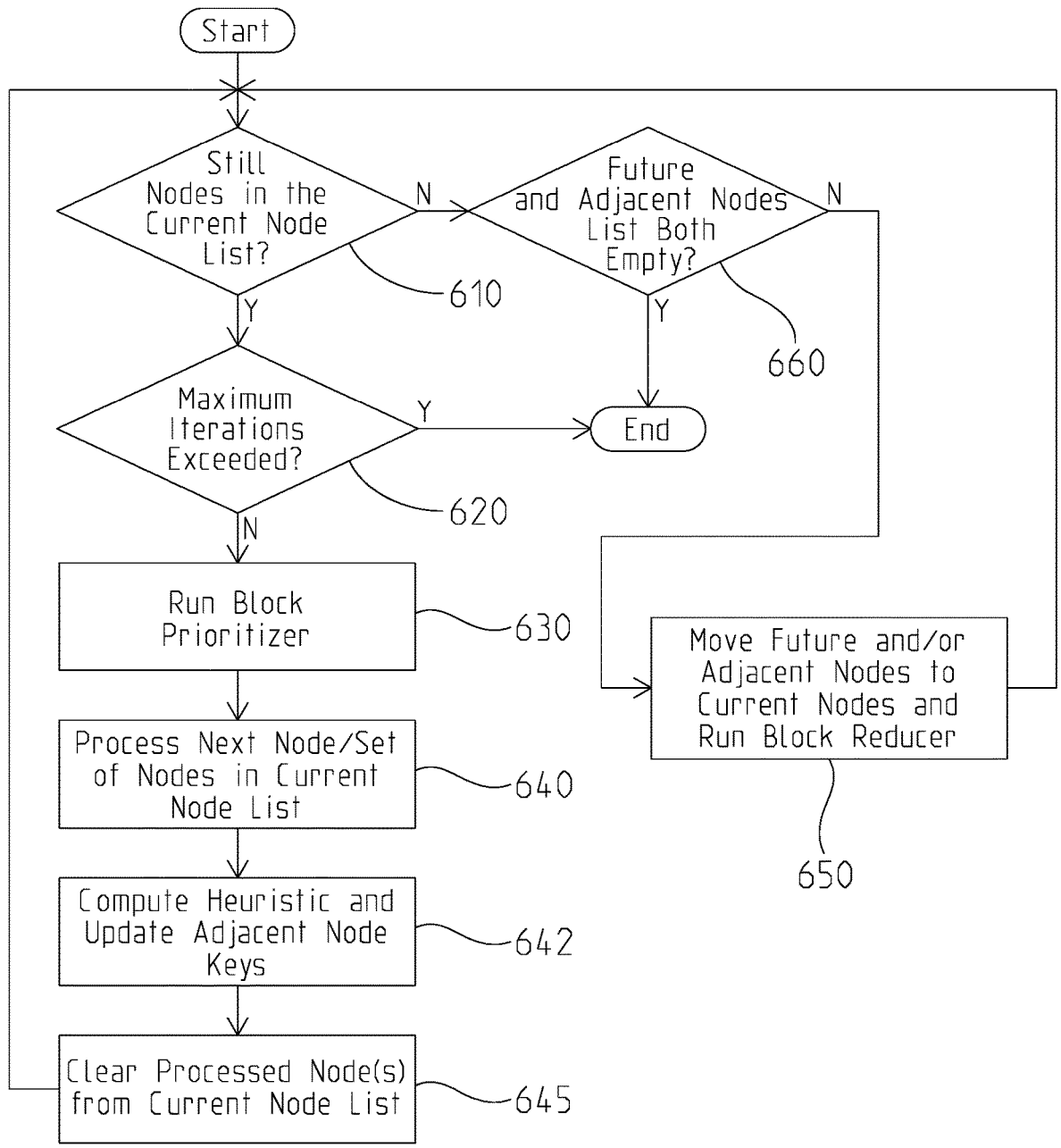
FIG. 6 is a flowchart showing operation of route flooding of the operations of FIG. 5.
Figure 13:
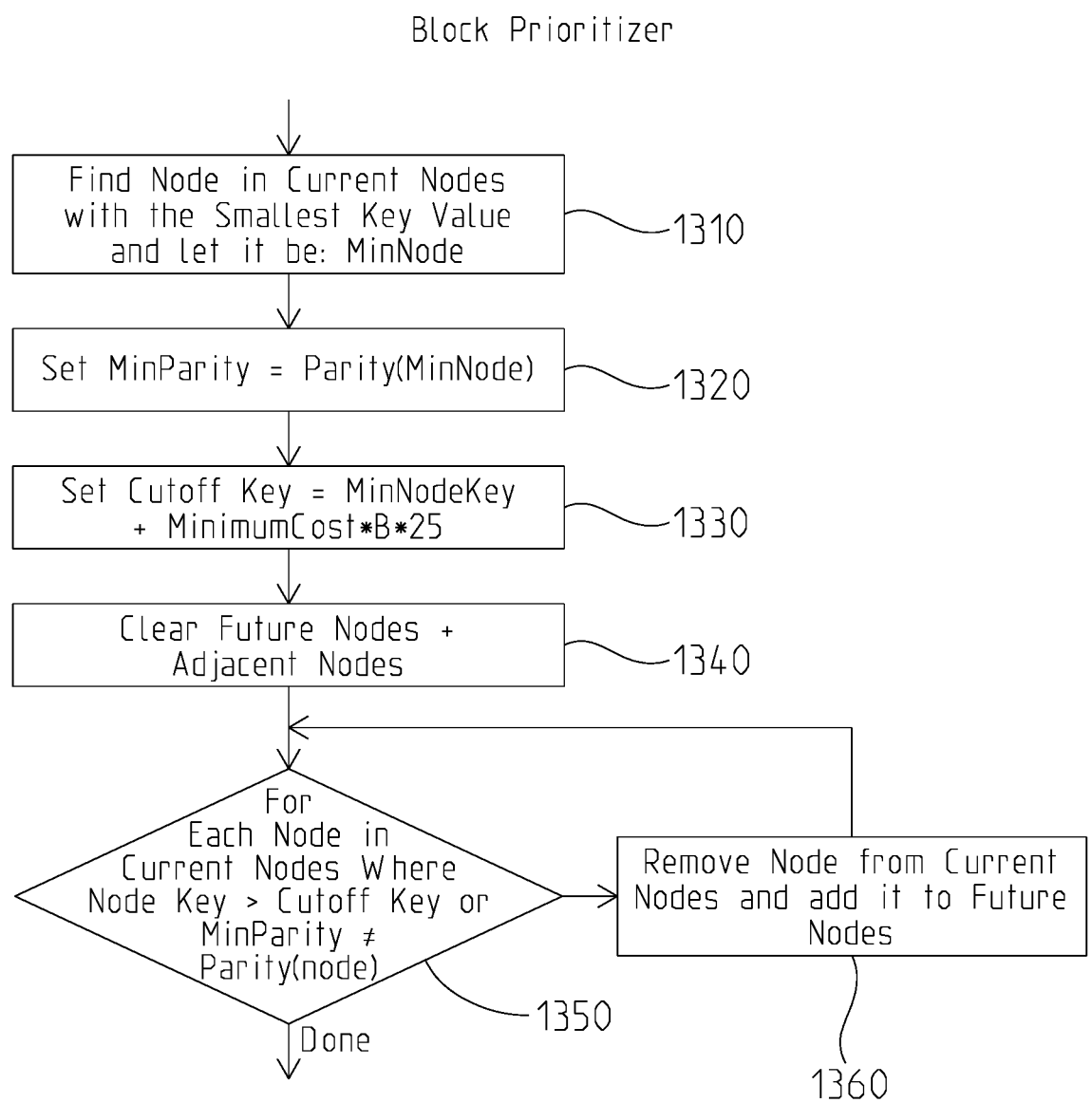
FIG. 13 is a flowchart showing operation of the block prioritizer of FIG. 6.

FIG. 13 provides additional detail on running the block prioritizer of element 630 (FIG. 6). The Block Prioritizer determines which of the pending traversal blocks should be processed next in Block Executer by prioritizing the nodes in Current Nodes and moving any nodes to be done later out and into Future Nodes. The remaining nodes in Current Nodes are chosen so that they may be executed by Block Executer in any order or even in parallel. The chosen nodes include the node with the smallest key (i.e., the most urgent) and any other nodes with similarly small keys, element 1310, and with the same block parity (see FIG. 4), element 1320. Just how similar the keys are will be determined by a key cutoff value, which can be tuned experimentally for desired performance, element 1330. In the shown example, the cutoff is set to equal to the MinimumCost value multiplied by twenty-five multiplied by "B" (where B is the number of cells in a rank (or file) of a block. The number 25 was empirically chosen to allow a suitable number of blocks to be processed concurrently without incurring excessive need to reprocess blocks). Choosing nodes all of the same parity ensures that they do not touch each other on edges (only corners) in order to minimize inter-dependency and support executing them in parallel. The MinParity value is set to Partity(MinNode) such that the minimum cost node defines the parity to be used in the next processing wave, element 1320. Once the cutoff Key is set, the Future Nodes and Adjacent Nodes lists are cleared, element 1340. Next it is determined which nodes in the current nodes list have a node key greater than the cutoff key or have a different parity from the MinParity, element 1350. Such nodes are removed from the Current Nodes list and appended to the Future Nodes list, element 1360.

Retracing initialization, element 530, is done by a Retrace Initializer 92. The retrace initializer reconfigures system 10 for a second run or the Route Flooder to perform a route retrace. The Retrace Initializer sets the flood mode to "Retrace." The Retrace Initializer also sets the Current Nodes list to contain a single node having the block with the route endpoint therein and sets the sweep directions for the node.

System 10 then proceeds to retrace the created route. When the flood mode is Retrace, Traversal Cell Retracer is used by Block Sweeper, (a processor executing block sweeping code) to mark any traversal cells that are in the final route, element 540. Unlike the Traversal Cell Optimizer, which expands the traversal map in all directions from the route start, Traversal Cell Retracer only updates a thin trail of traversal cells from the route end back to the start. Traversal Cell Retracer marks the traversal cells that are a part of the route my flipping the sign on them, making them negative. It works as follows:

If:
1. old traversal>0, and
2. one of the following is true:
    a. abs(old traversal+traversal via back cell)<Tolerance,
    b. abs(old traversal+traversal via back left cell)<Tolerance, or
    c. abs(old traversal+traversal via back right cell)<Tolerance, Then:
1. traversal(current cell)=–(old traversal), i.e. mark current cell as part of the final route.
2. Set Sweeper Changed Traversal to true, i.e. notify Route Executor that more sweeps in different directions are necessary.

To further explain the conditions above: Condition 1 ensures the current traversal cell has not already been marked as part of the final route to prevent doubling back or getting caught in a loop. Condition 2a checks whether old traversal and traversal via back cell are equal and opposite, since Tolerance is practically zero. If conditions 1 and 2a are both true, it can be deduced that traversal via back cell is negative, thus the back cell was already marked as part of the final route. We can also conclude that old traversal and traversal via back cell were equal before the retrace process started, thus the current cell is part of the fastest path to back cell. Hence, traversal(current cell) should be marked. Conditions 2b-c are the same as condition 2a, except they apply to the back and back left neighboring cells.

Figure 14:
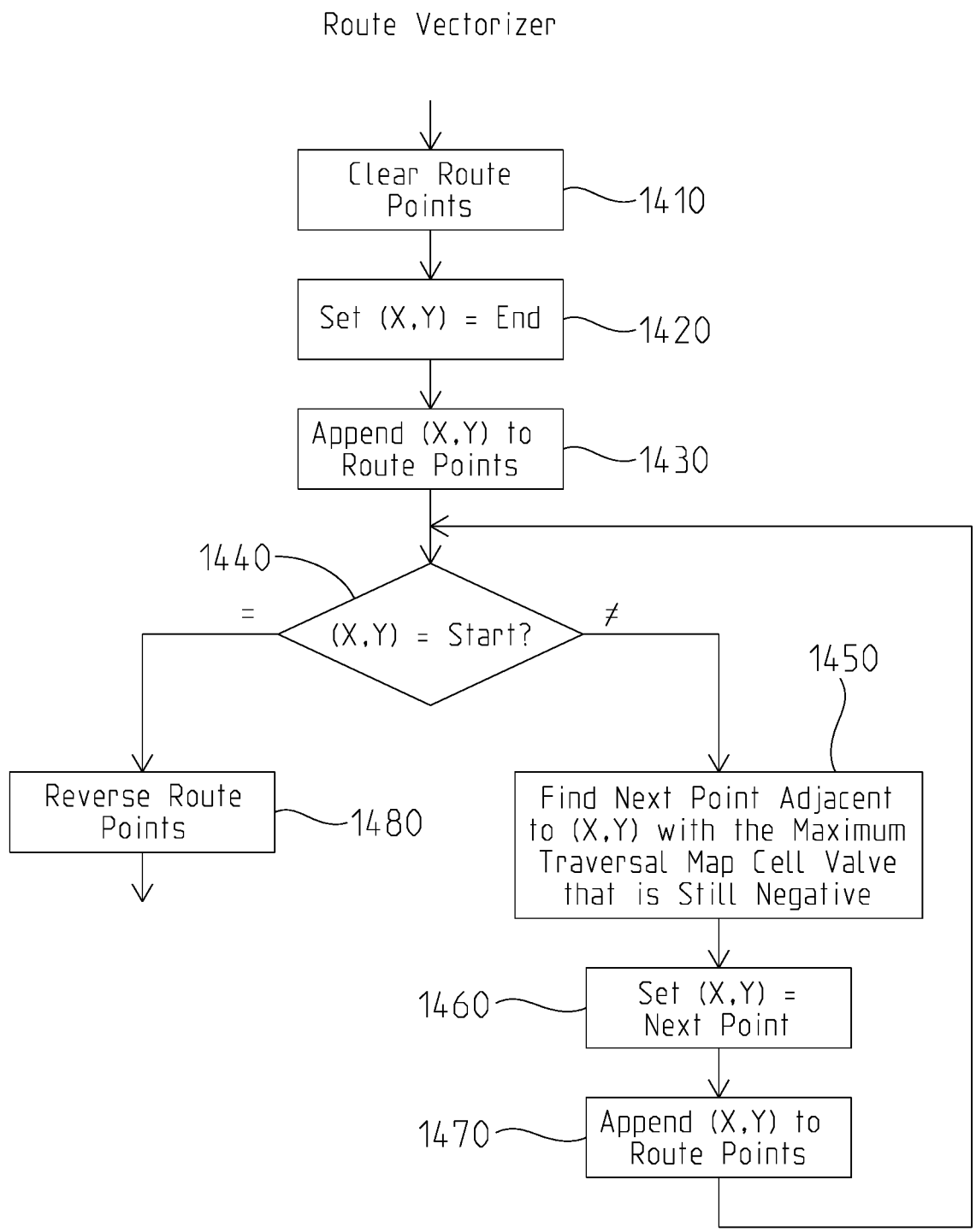
FIG. 14 is a flowchart showing operation of the Route Vectorizing of FIG. 5.

Next the route is vectorized via a Route Vectorizer 94, element 550. Route Vectorizer 94 is illustratively a processor executing code. Additional detail on operation of the Route Vectorizer 94 is provided in FIG. 14. The Route Vectorizer 94 generates the list of vertices that define the final route from the blocks and cells of the route generation. Route Vectorizer 94 starts at the traversal cell at the end of the route and works backwards to the starting cell. At each point, Route Vectorizer 94 finds which adjacent cell has the largest negative traversal value, adds that point to the list of route points, and proceeds to that point. Once the start of the route is reached, the list of route points is reversed, producing the final route, in map cell coordinates.

Route Vectorizer 94 first clears the route points, element 1410. Then, the route end point is set as a starting point, element 1420. The route end point (vectorizing start point) is appended to the route points list, element 1430. Route Vectorizer 94 then checks to see if it has reached the route start point, element 1440. When the route start point has not been reached, Route Vectorizer 94 checks all cells adjacent to the currently considered cell (initially the route end point) to find the cell having a negative value of greatest value (-epsilon, would be the negative value with the greatest value), element 1450. The found point is set as the next point in the route, element 1460, and appended to the route, element 1470. This process of elements 1450, 1460, and 1470 are repeated until the Route Vectorizer 94 reaches the route starting point. Once the Route Vectorizer 94 reaches the route starting point, the route is made up of a list of verticies running from the route end to the route start. Thus, the route points are then reversed to produce a list of vertices that define the route, element 1480.

For long routes, such as 50 miles long, the area that needs to be searched is quite large. To make a cost map and traversal map big enough to represent such a large area can require a prohibitive amount of memory to be allocated thereto. Block Swath is a simple and effective data structure for representing big maps by: 1) providing quick random access to any block of cells on the map, and 2) providing sparse mapping to reduce memory waste.

```
class BlockSwath
{
   int BlockSize;
   int ChunkSize;
   int WidthChunks;
   int HeightChunks;
   float [ ][ ][ ] Data;//float ***Data in C/C++
}
```

BlockSize describes the width and height of each block, in cells. Block Size should be a power of 2. ChunkSize describes the width and height of each chunk, in cells. ChunkSize should be a power of 2 and greater than BlockSize. WidthChunks describes a number of columns of chunks in swath. HeightChunks describes a number of rows of chunks in swath. Data describes a jagged array containing the actual cell data, addressable as Data[chunk][block][cell], where: chunk represents the index of the chunk containing the cell, $$chunk = \lfloor x/ChunkSize \rfloor + \lfloor y/ChunkSize \rfloor * WidthChunks$$

block represents the index of the block within the chunk:

$$block = (\lfloor x/BlockSize \rfloor + \lfloor y/BlockSize \rfloor * ChunkSize) \bmod ChunkSize^2$$

cell represents the index of the cell within the block:

$$cell = (x + y * BlockSize) \bmod BlockSize^2$$

x and y are the x- and y-cell coordinates from the northwest corner of the entire block swath.

By representing data this way, the unreached traversal blocks would not need to be allocated, saving (for example) 4 KB of memory per block. Likewise, unreached chunks would not need to be allocated, saving 256 bytes per chunk (assuming ChunkSize 256 bytes), which ends up being a large savings when dealing with extremely vast search areas.

Traversal map 1500 is a visual illustration of the traversal values generated and the route 1510 generated by system 10. Map 1500 includes a start point "d" and an end point "e" with route 1510 therebetween. Locations positioned on a common striation (such as striation 1520, 1530, 1540, 1550) represent locations having like travel time distances from the start point "d."

Embodiments are also envisioned that employ a bi-directional search. A bi-directional search involves generating two route searches, one starting at each end of the route, and stopping once they meet in the middle. This is more efficient as it reduces the total area searched and helps detect impassable routes where the route end is on an unreachable island.

Embodiments are further envisioned that employ multi-resolution routing. Multi-resolution routing involves generating a coarse-level route using a course cost map, and using that to limit the route generation at a fine level along a corridor around the previous route. More explicitly, in one embodiment, a block of 64 cells is treated as a single entity with a single cost value. The above-described routing is performed using only values for such coarse blocks to narrow the blocks likely to contain the ultimate route.

Figure 16:
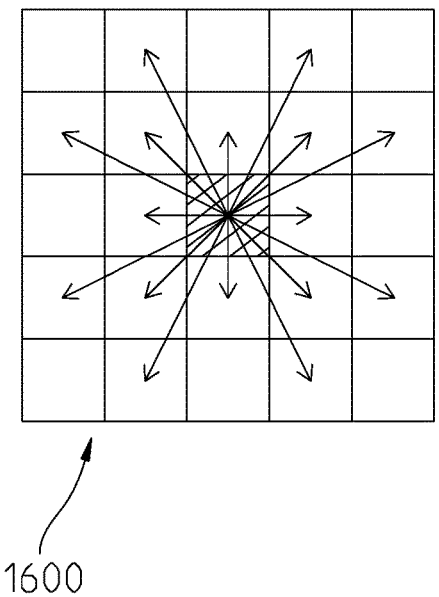
FIG. 16 is an illustration showing an alternative adjacency consideration for cells.

Embodiments are further envisioned that expand evaluation beyond movement to eight adjacent cells and instead consider 16-point adjacency. The additional adjacencies are shown in FIG. 16. The additional adjacencies include "chess-knight" adjacencies. Relative to eight-point adjacencies, sixteen-point adjacencies have the potential to provide increasingly smooth routes, increasingly accurate cost calculations, and increases in the angular travel options.

Embodiments are envisioned having dogleg removal. Dogleg removal helps eliminate jagged or "dogleg" paths (e.g. paths that go N for 100 meters then NE for 100 meters instead of going straight NNE for about 180 meters) that are common artifacts when trying to generate a route across an area of uniform (or near uniform) cost.

Embodiments are also envisioned that employ Look-Ahead Map Loading. Look-Ahead Map Loading sees how close the route search is to unloaded map tiles and prioritizes which map tiles get loaded next to ensure the route generation is not waiting on the map loading.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A method for generating a route, the method comprising:
    generating a traversal map corresponding to terrain of a map, the traversal map comprising a plurality of blocks, wherein:
        each block of the plurality of blocks comprises a plurality of cells that each correspond to a subpart of the block; and
        each block has a width defined as a first unit of cells and a height defined as a second unit of cells;
    generating, based on the traversal map, a route between a route start-point and a route end-point, wherein the route is located within the map and comprises a subset of blocks from the plurality of blocks;
    generating, for the generated route, a vectorized route comprising vertices from the route start-point to the route-end point that each correspond to a cell within a block of the subset of blocks; and
    generating, based on the vertices from the route start-point to the route-end point, a visual representation of the vectorized route overlaid on the map for presentation to a user.

2. The method of claim 1, wherein generating the vectorized route comprises:
    identifying, for a cell associated with the route, an adjacent cell having the largest negative traversal value; and
    generating a vertex in the vectorized route corresponding to the identified cell.

3. The method of claim 1, wherein each block of the plurality of blocks is assigned one of two polarity values.

4. The method of claim 3, wherein:
    each block having a first polarity is laterally adjacent other blocks having only a second polarity; and
    each block having the first polarity is diagonally adjacent other blocks having only the first polarity.

5. The method of claim 1, wherein route traversal values for at least two of the plurality of blocks are contemporaneously calculated by a graphics processing unit.

6. A method for generating a route, the method comprising:
    generating a coarse route corresponding to a set of blocks for a map, wherein each block of the set of blocks has:
        a width defined as a first unit of cells; and
        a height defined as a second unit of cells;
    generating, based on a plurality of cells for a first block of a subset of blocks that correspond to the coarse route, a first fine route;
    generating, based on a plurality of cells for a second block of the subset of blocks that correspond to the coarse route, a second fine route, wherein the second block is different than the first block; and
    providing, to a user computing device for display to a user of the user computing device, an ultimate route for the map based on the first fine route and the second fine route that is rendered by the user computing device.

7. The method of claim 6, wherein the ultimate route is generated based on a plurality of cells for a subset of blocks that correspond only to the coarse route.

8. The method of claim 6, wherein:
    a plurality of fine routes including the fine route are generated; and
    the coarse route is used to limit generation of the plurality of fine routes.

9. The method of claim 6, wherein generating the coarse route comprises determining, based on terrain movement cost data, a plurality of cost values comprising:
    a cost value for each block directly adjacent to the block of the subset of blocks; and
    a cost value for a block that is not directly adjacent to the block.

10. The method of claim 6, wherein the plurality of cells for the block that corresponds to the coarse route is treated as a single entity when generating the coarse route.

11. A method for generating a route, the method comprising:
    loading, into memory of a computing device, a first set of map tiles associated with a first region of a map;
    processing, as part of generating a route for the map, the first set of tiles associated with the first region;
    determining, based on the generating, to load an unloaded set of map tiles associated with a region of the map that is yet to be processed;
    based on determining to load the unloaded set of map tiles:
        loading, into the memory of the computing device, a second set of map tiles associated with a second region of the map, wherein the second set of map tiles is prioritized over a third set of map tiles that is unloaded; and
        processing, as part of generating the route, the second set of map tiles; and
    providing, based on the first set of map tiles and the second set of map tiles in the memory, a visual representation of the generated route for display, by a computing device, to a user.

12. The method of claim 11, wherein determining to load the unloaded set of map tiles comprises evaluating a proximity of the generating to the region of the map that is yet to be processed.

13. The method of claim 11, wherein the second set of map tiles is more proximate to the first region than the third set of map tiles.

14. The method of claim 11, wherein processing the first set of tiles comprises processing a set of blocks for the first region, wherein each block of the set of blocks comprises a plurality of cells.

15. The method of claim 11, wherein the first set of map tiles and the second set of map tiles are each loaded into cache memory of a graphics processing unit.

16. The method of claim 11, wherein the first set of map tiles and the second set of map tiles are each obtained from a remote database.

* * * * *